Figure 1:
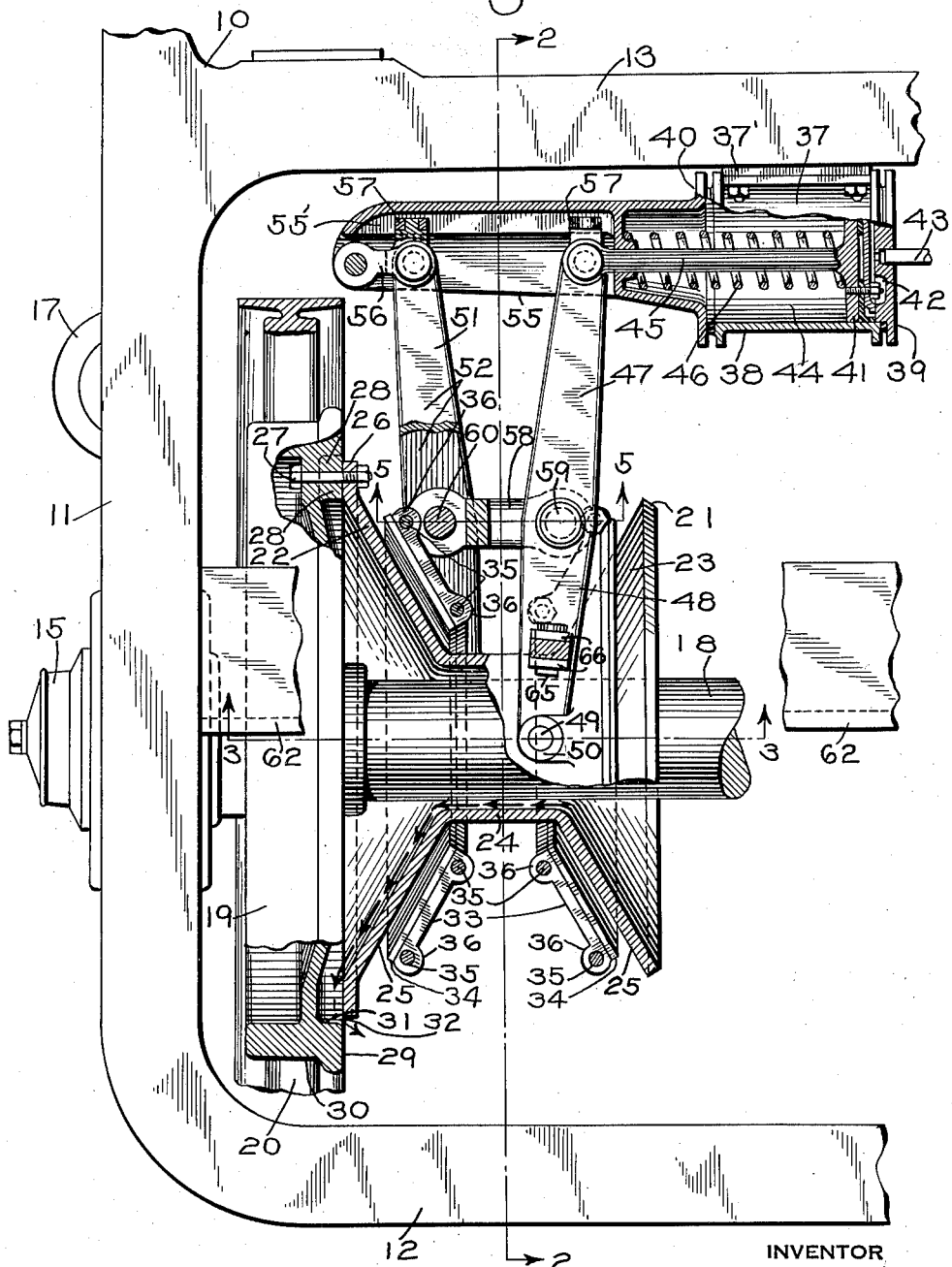

Sept. 26, 1939.  C. C. FARMER  2,174,398
VEHICLE BRAKE
Filed May 17, 1938  3 Sheets-Sheet 1

INVENTOR
CLYDE C. FARMER
BY
ATTORNEY

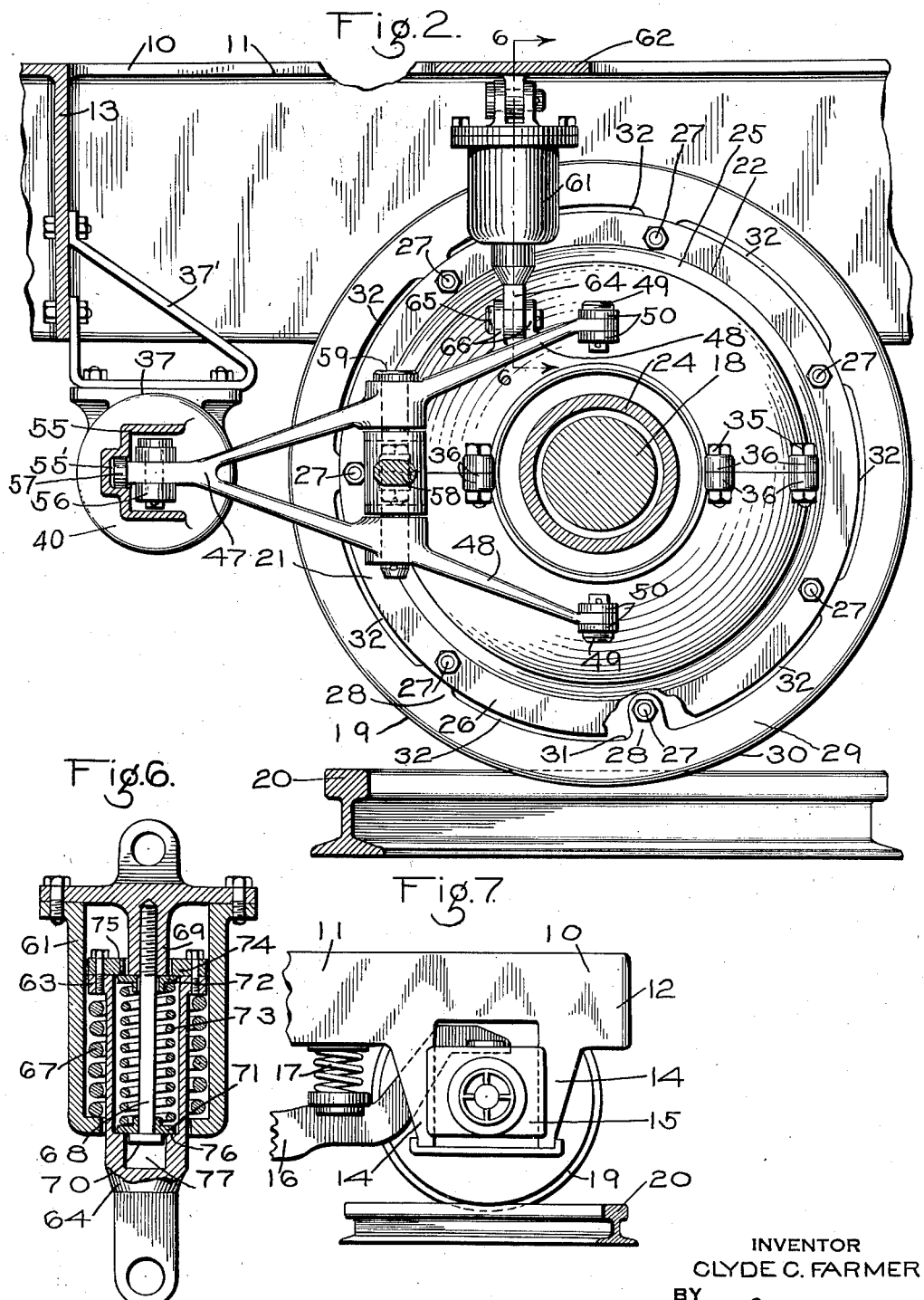

Sept. 26, 1939.   C. C. FARMER   2,174,398
VEHICLE BRAKE
Filed May 17, 1938   3 Sheets-Sheet 3
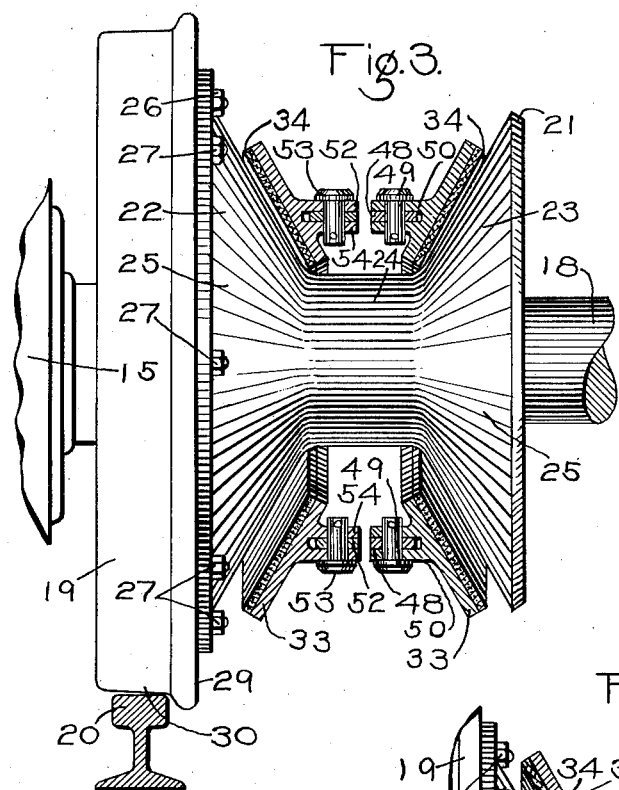
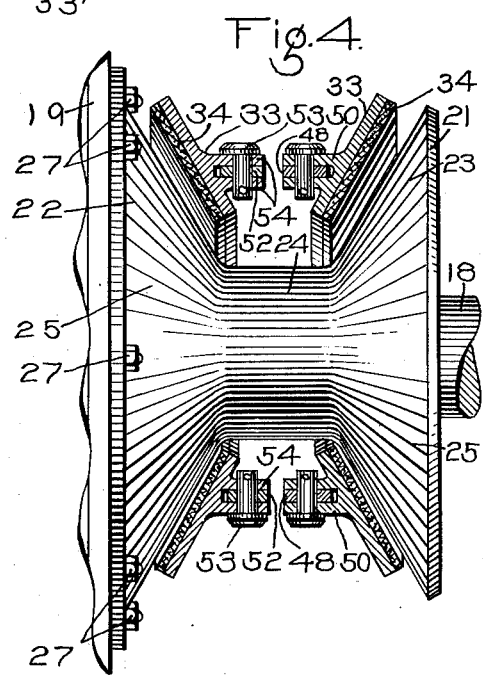
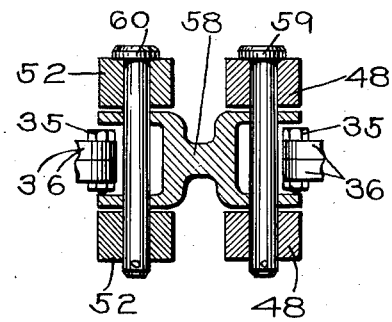
INVENTOR
CLYDE C. FARMER
BY
ATTORNEY Patented Sept. 26, 1939

2,174,398

UNITED STATES PATENT OFFICE 2,174,398

VEHICLE BRAKE

Clyde C. Farmer, Pittsburgh, Pa., assignor to The Westinghouse Air Brake Company, Wilmerding, Pa., a corporation of Pennsylvania Application May 17, 1938, Serial No. 208,403

47 Claims. (Cl. 188—59)

This invention relates to brake mechanisms for vehicles and more particularly to the type adapted for use on railway vehicle trucks and embodying annular rotatable and non-rotatable friction braking elements operable upon movement into frictional engagement to effect braking of the truck.

One object of the invention is to provide a unit brake mechanism of the above type for use on railway vehicle trucks.

Another object of the invention is to provide an improved brake mechanism of the above type in which no part of the mechanism is secured to and carried by the axle of the wheel and axle assemblies of vehicle trucks.

A still further object of the invention is to provide an improved brake mechanism of the above type in which the major portion of the weight of the mechanism is sprung; i. e., resiliently supported on the truck wheels.

According to the above objects, the improved friction brake mechanism comprises annular rotatable and non-rotatable friction braking elements and a brake cylinder device operatively connected to the non-rotatable elements for moving same into frictional braking engagement with the rotatable element for effecting braking of a wheel of the vehicle truck.

The rotatable element of the improved brake mechanism is preferably in the form of a sleeve like element encircling and spaced from the axle of a wheel and axle assembly and secured at one end to the inside face of one of the truck wheels, in concentric relation with said wheel and for rotation therewith. This sleeve is preferably in the form of a spool or drum-like brake element having on its outside circumferential face two oppositely disposed, annular, sloping or frusto-conical shaped braking surfaces. Encircling this sleeve and disposed to frictionally engage the braking faces thereon are two oppositely disposed, frusto-conical shaped non-rotatable friction braking elements. The brake cylinder device is operatively connected to the non-rotatable elements for controlling movement thereof into and out of frictional engagement with the rotatable element.

An important feature in the above described mechanism is that no part of the mechanism is supported on the truck axle and the only part of the mechanism which is unsprung is the rotatable element which is secured to a wheel of the wheel and axle assembly. The brake cylinder device is rigidly secured directly to the truck frame while the non-rotatable elements are spring supported on the truck frame, so that these parts of the mechanism are resiliently supported along with the truck frame from the truck wheels.

The brake cylinder device is preferably substantially the same as the conventional type employed in connection with the usual fluid pressure brake systems and is so mounted on the truck frame as to operate in a direction transversely of the truck, a novel leverage system being provided for operatively connecting this one brake cylinder device to the several non-rotatable elements for controlling their braking operation.

As is well known, the spring supported frame of a vehicle truck is capable of movement in a vertical direction relative to the truck wheels and will therefore move downwardly relative to the wheels while the vehicle is being loaded and will move upwardly relative to the wheels while the vehicle is being unloaded. The truck frame will therefore assume an elevated position with respect to the truck wheels depending upon the degree of load resting on the truck. Further, while the vehicle is in transit the truck frame will vibrate or move vertically relative to the wheels to some slight degree, due to roughness of the track or due to other service conditions to which the vehicle is subjected. It will therefore be readily understood that, due to any of the above enumerated causes, the parts of the improved brake mechanism carried by the truck frame will move with said frame relative to the rotatable element secured to the truck wheel, and as a result the non-rotatable elements will at different times and under various conditions assume different eccentric positions with respect to the rotatable element.

The non-rotatable braking elements of the improved brake mechanism are adapted to be moved into frictional braking engagement with the rotatable element in order to effect braking of the wheel to which the rotatable element is secured. At the time the brakes on the truck are thus applied, it is desired that the full braking surface of the non-rotatable elements frictionally engage the rotatable element and in order to accomplish this it is essential that the non-rotatable elements be in substantial concentric relation with the rotatable element.

Another object of the invention is therefore to provide means whereby the non-rotatable elements of the brake mechanism are caused to move relative to the truck frame and rotatable element into substantial concentric relation with the rotatable element in order to effect braking thereof and thereby of the truck wheel to which the rotatable element is secured.

The non-rotatable elements of the improved brake mechanism are spring supported from the truck frame, as above mentioned, in order to permit movement thereof into concentric braking relation with the rotatable element, as just described. According to the present embodiment of the invention this centralizing of the non-rotatable elements with respect to the rotatable element is preferably accomplished through the medium of the sloping or frusto-conical shaped braking surfaces of the braking elements, it being noted that when the non-rotatable elements are in eccentric relation with the rotatable element and are moved into frictional engagement therewith, they will initially engage the braking surfaces of the rotatable element at only one side. Then as the non-rotatable elements are forced against the rotatable element, the engagement at one side will cause shifting of the non-rotatable elements relative to the rotatable element, whereby the non-rotatable elements will be propelled into concentric braking relation with the rotatable element.

The novel lever system connecting the brake cylinder device to the non-rotatable elements is so arranged as to permit the centralizing action above described, and according to a further feature of the invention said lever system is also adapted to hold the non-rotatable element against turning with the rotatable element while effecting braking thereof.

It is well known that a great amount of heat is developed in the friction braking elements of brake systems at the time said elements are in frictional braking engagement, and in order to obtain efficient braking it is essential that the heating of said elements be not excessive.

Another object of the invention is therefore to provide improved means for dissipating the heat generated between the rotatable and non-rotatable friction braking elements when in frictional braking engagement, so as to thereby maintain said elements sufficiently cool to insure efficient braking.

According to this last object means are provided for causing a constant circulation of air through the interior of the rotatable brake element and particularly over the inner surfaces of the frustro-conical portions of the element, in order to dissipate heat therefrom incident to braking.

Other objects and advantages will be apparent from the following detailed description of the invention.

In the accompanying drawings, Fig. 1 is a plan view of a portion of a railway vehicle truck showing the improved brake mechanism applied to a wheel of the truck, portions of the mechanism being shown broken away to more clearly illustrate the invention; Fig. 2 is a longitudinal sectional view taken on the line 2—2 in Fig. 1; Fig. 3 is a sectional elevational view taken on the line 3—3 in Fig. 1 and illustrating the non-rotatable braking elements in the position which they may assume with respect to the rotatable element when the vehicle supported by the truck is in a fully loaded condition; Fig. 4 is a view similar to Fig. 3 illustrating the non-rotatable elements in the position which they may assume with respect to the rotatable element when the vehicle carried by the truck is in an empty condition; Fig. 5 is a detailed, fragmentary sectional view taken on the line 5—5 in Fig. 1; Fig. 6 is a detailed, sectional view, on an enlarged scale, through a spring supporting device for the brake mechanism, this view being taken on the line 6—6 in Fig. 2; and Fig. 7 is a side elevational view, on a reduced scale, of one end portion of the railway vehicle truck with which the invention is associated.

As shown in the drawings the improved brake mechanism is shown associated with a vehicle truck, which for the purpose of illustration, may comprise a truck frame 10 of the type having spaced side frames 11 which may be connected in the usual manner by transversely extending end pieces 12 and transoms 13.

Each of the side frames 11 is provided with the usual depending pedestals 14 between each pair of which is mounted a journal box 15. An equalizer bar 16 is provided at each side of the truck, the opposite ends of the equalizer bars being supported on the journal boxes 15. Each of the equalizer bars 16 is provided for carrying springs 17 upon which the truck frame 10 is resiliently supported in the usual manner. An axle 18 of a wheel and axle assembly has its opposite ends journaled in the journal boxes 15 at one end of the truck, and secured to said axle in any desired manner and in the usual spaced relation are wheels 19 which are adapted to roll on track rails 20.

Only a portion of the elements of the truck frame above described are shown in the drawings, but this showing is considered adequate to a clear and comprehensive understanding of the invention.

According to the invention a rotatable braking element 21 is secured to the inner face of the wheel 19 in concentric relation with said wheel, said element encircling but not contacting the axle 18.

The rotatable element 21 is preferably in the form of a spool like sleeve or drum having spaced, oppositely facing frusto-conical shaped outer and inner enlargements or end portions 22 and 23, respectively. The end portions 22 and 23 are preferably integrally connected together at their adjacent ends by a tubular intermediate portion 24. The sloping outside surface of each of the end portions 22 and 23 of the sleeve 21 constitute braking faces 25 on the rotatable element.

The portion 22 of sleeve 21 is provided at its outer end with an outwardly extending radial flange 26 which is rigidly clamped by means of bolts 27 to spaced radial lugs 28 formed integral with and extending inwardly from the inner face 29 of the tread portion 30 of the wheel 19.

As shown in Fig. 2 of the drawings, the securing flange 26 is circular in form and is of less diameter than the inner surface 31 at the tread portion 30 of the wheel, so that between each pair of adjacent lugs 28 the edge of the flange 26 and the surface 31 on the wheel defines an opening 32 through which air from the interior of the sleeve 21 may freely flow to the atmosphere. When the wheel and sleeve are rotating air will be drawn through the sleeve in the direction indicated by the arrows on Fig. 1, and this flow of air is adapted to act when the brakes are applied, as will be hereinafter described, to carry away heat from the sleeve incident to the braking and thereby prevent excessive heating of the sleeve and other parts of the mechanism.

A pair of oppositely disposed annular non-rotatable friction braking elements 33 are disposed in the space between the end portions 22 and 23 of the sleeve 21, which elements encircle the sleeve. Each of the non-rotatable elements 33 is frusto-conical in shape, conforming to the shape of the associated end portion of the sleeve 21 and is provided with a friction braking surface for engagement with the sleeve, which braking surface is preferably formed on a brake lining or member 34 removably secured to the element 33. This member 34 may be made of any desired friction braking material, such as a metallic or fibrous material.

The diameter of the opening at the smaller end of each of the non-rotatable elements 33 is greater than the diameter of the tubular portion 24 of the sleeve 21 in order that the non-rotatable elements 33 may move in a vertical direction relative to said sleeve when the brakes are released as shown in the drawings.

In order to facilitate the assembly and removal of the non-rotatable elements 33 from the mechanism each element 33 and its lining 34 is made in two substantially semi-circular complementary sections which in their operating or assembled condition are rigidly but removably secured together at their opposite ends by bolts 35. It will be noted that the opposite ends of each of the sections of the non-rotatable elements are provided with out-standing clamping lugs or ears 36 for accommodating the bolts 35. By the construction just described it will be evident that whenever it is desired to renew or for any other reason remove and apply non-rotatable elements 33 to sleeve 21 such may be readily accomplished with the bolts 35 removed.

A brake cylinder device 37 which is disposed to operate in a direction transversely of a truck frame 10, is rigidly secured to any desired portion of said frame, such for instance as a bracket 37' which is rigidly secured to the transom 13 of the truck frame.

The brake cylinder device 37 is of the same general type as employed in connection with the usual fluid pressure brake systems and comprises a body 38 having a piston bore extending through and open at opposite ends of said body. One end of this bore is closed, as is usual, by a pressure head 39 while the opposite end is closed by a non-pressure head 40 which differs somewhat from the conventional type of non-pressure head in a manner hereinafter described. Disposed to work in said bore between said heads is a brake cylinder piston 41.

The piston 41 has at one side a chamber 42 which is connected to a pipe 43 through which fluid under pressure is adapted to be supplied to said chamber for effecting movement of the piston 41 in a direction toward the left hand in order to effect an application of the brakes, and through which fluid under pressure is adapted to be vented from said chamber in order to effect a release of the brakes, in the usual manner. At the opposite side of the piston 41 there is a chamber 44. The piston is provided with a rod 45 which extends through chamber 44 and through the end of the non-pressure head 40. The chamber 44 is open to the atmosphere in any desired manner as by way of clearance space normally provided between the rod 45 and the inner surface of the bore in the non-pressure head through which said rod extends. A release spring 46 in chamber 44 acting on the piston 41 is provided for moving said piston to its release position in the usual manner.

Pivotally connected to the end of piston rod 45 outside of the brake cylinder body is the closed end of a substantially V-shaped brake lever 47 having a pair of oppositely disposed outwardly extending leg portions 48, terminating one above the axle 18 and the other diametrically below said axle. The ends of the legs 48 of the lever 47 are pivotally connected to diametrically opposite portions of the inner non-rotatable element 33, through the medium of two vertically disposed pins 49 secured in outstanding ears 50 on the adjacent portion of the non-rotatable element.

A brake lever 51, similar to lever 47 and having leg portions 52 which correspond with the leg portions 48 of the lever 47 is pivotally connected to the other non-rotatable element 33 through the medium of vertically disposed pivot pins 53 carried in outstanding portions on ears 54 provided on the adjacent portions of the non-rotatable element.

Projecting from the non-pressure head 40 of the brake cylinder device 37 is a channel shaped extension 55 to the outer end of which is pivotally connected one end of a link 56, the other end of which link is pivotally connected to the closed end of the brake lever 51. It will be noted that the closed ends of both brake levers 47 and 51 are disposed to operate between the side walls of the channel shaped extension 55. In the back wall of the channel 55 there is provided a secondary channel 55' into which the end of the brake levers 47 and 51 extend and on the end of each of said levers within this secondary channel there is provided a roller 57 through the medium of which the closed end of the two levers is adapted to be supported from the truck frame through the medium of the brake cylinder device 37.

The diameter of the rollers 57 is slightly less than the distance between the side walls of the secondary channel 55' so as to permit free rolling movement of said rollers therein, said rollers being provided to facilitate relatively free movement of the brake levers by the brake cylinder device while said levers are pressed against one or the other side walls of the secondary channel 55' in holding the non-rotatable elements 33 against rotation while the brakes are applied, as will be clear from the description to follow.

The two brake levers 47 and 51 are connected together intermediate their ends by a link 58 which is pivotally connected at one end to the lever 47 through the medium of a pin 59 and at the other end is pivotally connected to the lever 51 through the medium of a pin 60.

From the above description it will be noted that while the brake cylinder device 37 and the connected ends of the brake levers 47 and 51 are rigidly supported in a vertical direction by the truck frame and therefore adapted to move with said frame, the non-rotatable elements 33 and the connected ends of said levers are capable of movement in a vertical direction relative to the sleeve 21, when said non-rotatable elements are in their release position as shown in the drawings; there being sufficient looseness of the rollers 57 in the secondary channel 55' and of the link 56 on its pivot pins to permit such movement of said levers.

According to the invention there is provided a resilient supporting device 61 for each of the non-rotatable elements 33 and the adjacent portions of the respective brake levers 47 and 51 through the medium of which said elements and the associated ends of said brake levers are adapted to be supported from the truck frame 10 and therefore normally movable with said frame.

Each of the supporting devices 61 comprises a casing pivotally connected at one end to any suitable portion of the truck frame, such as a cross member 62 which may extend between and be carried by the side frames 11. A plunger 63 is provided in the casing of each device 61 and has a stem 64 projecting through an opening in the lower end wall of said casing. The end of each stem 64 is pivotally connected to the upper leg portion of the adjacent brake lever 47 or 51 through the medium of a bolt 65 secured in a pair of spaced, upstanding lugs 66 provided on the upper leg portion of the brake lever. Mounted in the casing of each device 61 between the lower face of the plunger 63 and the lower end of said casing is a spring 67 acting upwardly on the plunger with a force which is just sufficient to substantially counterbalance the weight of the connected non-rotatable element 33 and adjacent portion of the connected brake lever 47 or 51.

Each plunger stem 64 is provided with an axial bore open at its upper end through the plunger 63, and extending into said bore is a pin 68. One end of this pin is secured in a depending boss 69 in the casing while on the other end there is provided a head 70. Between the end of the boss 69 and the pin head 70 are two spring seats 71 and 72 slidably mounted on the pin. A spring 73 encircling the pin 68 is interposed between the spring seats 71 and 72 for normally urging said seats in opposite directions into engagement with the head 70 and the end of the boss 69, respectively.

A plate 74 having a central aperture through which the boss 69 extends is secured to the plunger 63, the diameter of said aperture being less than that of the bore in the plunger stem 64 so as to thereby provide a shoulder 75 for engaging the spring seat 72. The plunger stem 64 is provided adjacent the bottom of the bore therein with a shoulder 76 for engaging the spring seat 71 and below said shoulder there is provided a bore 77 of sufficiently great diameter to permit free movement of the pin head 70 therein.

The spring 67 in each of the devices 61 is provided for counterbalancing the weight of the connected non-rotatable element 33 and adjacent portion of the connected brake lever as hereinbefore described. With the parts of the spring supporting devices 61 in the position shown in the drawings each of the springs 73 is inactive, since the spring seats 71 and 72 engaging the pin heads 70 and the end of the depending bosses 69 in the devices 61 act to confine the springs 73.

It will be evident that since the non-rotatable elements 33 and the adjacent portion of the connected brake levers 47 and 51 are connected to the truck frame through the medium of the springs 67, vibration of the truck frame due to the wheels 19 striking rough spots on the rail 20 or for any other reason, will tend to cause said braking elements to oscillate relative to said truck frame. The spring 73 in each of the supporting devices 61 is provided to dampen such oscillation. It will be noted that in case the non-rotatable elements 33 tend to move upwardly relative to the truck frame 10 the consequent movement of the plunger stems 64 into the devices 61 will pick up the lower spring seats 71 and move them against the pressure of the springs 73, the other ends of which at this time are fixed due to the spring seats 72 engaging the end of bosses 69.

Each of the springs 73 is confined between the spring seats 71 and 72 under a predetermined pressure, so that in case the non-rotatable elements tend to move upwardly relative to the truck frame, as just described, the springs 73 become immediately effective to oppose and stop such movement and return the supported parts of the brake mechanism to their normal position. In case, due to vibration of the truck frame, the non-rotatable elements 33 and associated portions of the brake levers 47 and 51 tend to move downwardly relative to the frame the consequent movement of plungers 64 outwardly of the supporting devices 61 will pick up the spring seats 71 and move them toward the spring seats 72 against the pressure of the springs 73, it being noted that under this condition the heads 70 of pins 68 act to hold the spring seats 71 against movement. The pressure of the springs 73 therefore immediately becomes effective to oppose such downward movement of the supported parts of the brake mechanism relative to the truck frame and return said parts to their normal position, as shown in the drawings.

The main supporting springs 67 would permit oscillation of the supported parts of the brake mechanism, as will be evident, but since the springs 73 immediately become effective to oppose any movement of said parts from their normal position with respect to the frame, it will be evident that said parts will normally be suspended from the truck frame in a substantially fixed position with relation to the truck frame.

From the above description it will be noted that the only unsprung portion of the brake mechanism is the sleeve 21 which is secured to the inner face 29 of the wheel 19. All other parts of the brake mechanism are carried by the truck frame and therefore will move with said frame relative to the wheel 19 to the different elevated positions which said frame may assume due to different degrees of load carried by the vehicle or for any other reason.

It will therefore be evident that the non-rotatable elements 33 will assume various positions eccentric to the rotatable braking element or sleeve 21. For instance, if the vehicle carried by the truck frame 10 is in a fully loaded condition said frame and therefore the non-rotatable elements 33 will be in their lowermost position with respect to wheel 19. This condition is illustrated in Fig. 3 of the drawings from which it will be noted that the non-rotatable elements 33 are in eccentric relation to the sleeve 21 with the upper portions of said elements just slightly spaced from the braking surfaces 25 of the sleeve 21 while the lowermost portions of said elements are spaced away from said surfaces a considerable distance.

A condition just the reverse of that shown in Fig. 3 is obtained when the vehicle carried by the truck frame 10 is empty. Under the empty condition the truck frame 10 and therefore the non-rotatable elements 33 are in their most elevated position with respect to wheel 19, this condition of said brake elements being shown in Fig. 4 of the drawings from which it will be noted that the lowermost portions of said elements are just slightly spaced from the adjacent braking faces 25 of sleeve 21 while the uppermost portions of said elements are spaced away from said surfaces a considerable distance.

If, however, the truck frame 10 is in a position midway between its most elevated and its most depressed position, which position it might assume in case the vehicle carried by the truck were only half loaded, it will then be noted that the non-rotatable elements 33 will be positioned in substantial concentric relation with the braking surfaces 25 on the sleeve 21.

*Operation*

In the drawings the various parts of the brake mechanism are shown in the position which they assume with the brakes on the truck released, it being noted that the non-rotatable elements 33 are spaced from and therefore out of engagement with the surfaces 25 on the rotatable element or sleeve 21, as a result of which the wheel 19 and sleeve 21 are adapted to freely turn as the truck moves along the track rail 20.

If it is desired to effect an application of the brakes on the truck so as to thereby retard or stop rotation of the wheel 19, fluid under pressure is supplied to the brake cylinder pipe 43 in any desired manner, such as by the operation of the usual triple valve device (not shown) employed for controlling the brakes on railway vehicles.

The fluid under pressure thus supplied to pipe 43 flows into pressure chamber 42 and acts on the piston 41 to move said piston in a direction toward the left hand against the opposing pressure of the release spring 46. This movement of piston 41, transmitted through the piston rod 45, acts to move the connected end of the brake lever 47 in a direction toward the left hand and consequently rocks said lever in a counterclockwise direction about the pivot pin 59.

This movement of the lever 47 may continue until the non-rotatable element 33 supported in its forked end engages the braking face 25 on the inner end portion 23 of the sleeve 21. Such engagement then acts to temporarily stop further movement of the adjacent end of the brake lever 47 so that continued movement of said lever by the piston rod 45 acts to shift the fulcrum pin 59 and link 58 in a direction toward the left hand. As a result the brake lever 51 is rocked in a clockwise direction about its pivotal connection with the link 56 which is secured in the channel extension 55 of the brake cylinder device. This movement of the lever 51 continues until the connected non-rotatable element 33 is moved into contact with the braking surface 25 on the outer end portion 22 of sleeve 21.

If the non-rotatable elements 33 are in concentric relation with the braking surfaces 25 on sleeve 21 when said elements are in their release position then said elements upon movement into engagement with said surfaces in effecting an application of the brake will engage said surfaces over the full face of the friction elements 34. After this condition is obtained further movement of the brake cylinder piston 41 toward the left hand will then merely act through the levers 47 and 51 to force the non-rotatable elements against surfaces 25 for effecting braking of the sleeve 21 and thereby the wheel 19. The degree with which wheel 19 is thus braked depends upon the pressure of fluid supplied to the pressure chamber 42 for acting on the brake cylinder piston 41, which determines the pressure with which the non-rotatable elements 33 are pressed into frictional contact with the sleeve 21, and this pressure may be varied by varying the pressure of fluid supplied to said chamber in the usual manner.

If at the time an application of the brakes is initiated the non-rotatable elements 33 are in the position assumed with the truck frame 10 in its most depressed condition as shown in Fig. 3 of the drawings, it will then be evident that in applying the brakes only the uppermost portions of the non-rotatable elements 33 will initially engage the braking surfaces 25 on the sleeve 21. After this engagement is obtained and the pressure forcing the elements 33 against the sloping surfaces 25 is increased sufficiently, said elements are caused to climb said surfaces until the lowermost portions of the elements engage the lowermost portions of the surfaces. When this condition is obtained the non-rotatable elements 33 are in concentric relation with the rotatable element 21 and engaging the surfaces 25 over substantially the full braking faces of the non-rotatable elements. Further pressure applied to the non-rotatable elements by the brake cylinder device 37 then forces said elements into braking engagement with the sleeve 21 for braking the wheel 19, as above described.

It will be noted that the springs 73 in supporting devices 61 act to oppose movement of the non-rotatable elements 33 from the position shown in Fig. 3 of the drawings into concentric relation with the sleeve 21, as above described. This, however, is of little consequence in so far as braking of the truck is concerned, since only a relatively light pressure on the brake cylinder piston 41 is required to move the non-rotatable elements 33 into concentric braking relation with the sleeve 21. In other words, the force with which the elements 33 are pressed against the surfaces 25 of sleeve 21 during the centralizing action, as determined mainly by the resistance of springs 73, is so small as not to provide any appreciable braking action on the sleeve 21 and in so far as braking of the truck is concerned is negligible.

If at the time the brakes on the truck are applied the non-rotatable elements 33 are in the eccentric position shown in Fig. 4 of the drawing, with respect to sleeve 21, it will then be noted that the lowermost portions of said elements will first engage the surfaces 25 on the sleeve 21 and then as the pressure is increased on said elements, said elements will be forced down the sloping surfaces 25 until the uppermost portions of said elements engage said surfaces at which time said elements will be in concentric braking relation with the sleeve 21. After the elements 33 are thus moved into concentric braking relation with the sleeve 21 further pressure applied by the brake cylinder piston to said elements forces said elements into engagement with sleeve 21 with such force as to brake the wheel 19, as above described.

It will be noted that movement of the non-rotatable elements 33 from the position shown in Fig. 4 to their concentric braking position is opposed by both of the springs 67 and 73 in the spring supporting devices 61, but the pressure required to overcome these springs is relatively low and therefore negligible in so far as the braking action is concerned.

At the time an application of the brakes is effected on the truck the non-rotatable elements 33 may be in any position eccentric to sleeve 21 between the positions shown in Figs. 3 and 4 of the drawings, according to different degrees in load carried by the truck frame or due to vibration. It will however be evident that regardless of the position of the non-rotatable elements 33 with respect to sleeve 21 at the time an application of the brakes is effected, said non-rotatable elements will be first moved into concentric braking relation with surfaces 25 on the sleeve 21 and then operated to apply the brakes.

It will be evident that as the non-rotatable brake elements 33 are moved relative to the truck frame into concentric relation with the rotatable element 21, there may be a slight longitudinal movement of the brake levers 51 and 47 relative to the brake cylinder device 38. This however is provided for by the link 56 connected to the lever 51 and by slight clearance (not shown) provided in the connection between the lever 47 and piston rod 45.

At all times when the wheel 19 is rotating there will be a flow of air through the interior of the sleeve 21 and out through the slots 32 provided around the rim of the wheel 19 between the bolting lugs 28. The direction of this flow is indicated by arrows in Fig. 1 of the drawings and it will be noted that it occurs over the interior portions of the sleeve opposite the braking faces 25 and is adapted to carry away heat from the sleeve caused by the frictional engagement of the non-rotatable elements 33 with the surfaces 25 for thereby preventing excessive heating of the sleeve during braking.

Due to the ends of the brake levers 47 and 51 adjacent the brake cylinder device 37 being supported in the auxiliary channel 55' said levers act during braking to hold the non-rotatable elements 33 against turning with the sleeve 21.

The rollers 57 on the ends of levers 47 and 51 act to facilitate relatively free movement of the levers upon operation of the brake cylinder piston 41 after the non-rotatable elements 33 are in frictional contact with the sleeve 21 and said levers are therefore acting to hold said elements against rotation.

It will be noted that the brake cylinder device is not only provided for applying the brakes but it also acts upon initiating an application of brakes to first move the non-rotatable elements to their proper braking position.

If it is desired to effect a release of the brakes after an application, fluid under pressure is vented from the brake cylinder pipe 43 in any desired manner, as by operation of the triple valve device above mentioned, and thereby from the brake cylinder pressure chamber 42. The release spring 46 in the brake cylinder acting on the piston 41 then moves said piston back to the release position as shown in the drawings and this movement acts to rock the brake lever 47 in a clockwise direction and through the medium of link 58 rocks the brake lever 51 in a counterclockwise direction thereby drawing the two non-rotatable elements 33 away from the braking surfaces 25 on the sleeve 21. As the non-rotatable elements 33 start to move toward each other from their braking position, the spring supporting devices 61 act to move said elements in a vertical direction relative to the sleeve 21 and back to their normal position in eccentric relation to the sleeve 21, unless the vehicle truck frame 10 is in such condition that with the brakes released said non-rotatable elements are normally in concentric relation with the sleeve 21.

From the above description it will be noted that while the improved brake mechanism is so arranged as to not materially increase the sprung weight of the truck, the construction for insuring the centralizing of the non-rotatable elements with relation to the rotatable sleeve 21 and the brake cylinder and lever system for actuating the non-rotatable elements are relatively simple and inexpensive.

It should here be mentioned that since the sleeve 21 is secured to the wheel close to the tread portion thereof relatively long braking arms are provided and this construction minimizes the possibility of breakage of the truck axle 18 or of loosening said axle in the wheel 19 during braking.

While in the drawings only a sufficient portion of the truck frame is shown to show the application of the improved brake mechanism to one wheel, it will be evident that said mechanism may be applied to any number of wheels of a truck, and even to both wheels of wheel and axle assemblies.

While one illustrative embodiment of the invention has been described in detail, it is not the intention to limit the scope to that embodiment or otherwise than by the terms of the appended claims.

Having now described my invention, what I claim is new and desire to secure by Letters Patent, is:

1. A brake mechanism for a vehicle truck having wheels and a frame carried by said wheels, said mechanism comprising an annular, rotatable friction braking element secured to rotate with one of said wheels, and having oppositely disposed friction braking faces, an annular non-rotatable friction braking element adapted to frictionally engage one of said faces, another annular non-rotatable friction braking element adapted to frictionally engage the other of said faces, a brake cylinder device comprising a body, a piston disposed to operate in said body, a brake lever connecting said piston to one of said non-rotatable elements, a brake lever connecting the brake cylinder body to the other of said non-rotatable elements, and means operatively connecting said levers together whereby said piston is operatively connected to both of said non-rotatable elements for controlling the operation thereof.

2. A brake mechanism for a vehicle truck having wheels, and a frame resiliently supported on said wheels, said mechanism comprising an annular rotatable friction braking element secured to one of said wheels for rotation therewith, an annular non-rotatable friction braking element adapted to frictionally engage said rotatable element for braking said wheel, means for supporting said non-rotatable element from said frame for movement therewith and operative to render said non-rotatable element movable in a vertical direction relative to said frame and rotatable element, and a brake cylinder device carried by said frame and operatively connected to said non-rotatable element for controlling the operation thereof.

3. A brake mechanism for a vehicle truck having wheels, and a frame resiliently supported on said wheels, said mechanism comprising an annular rotatable friction braking element secured to one of said wheels for rotation therewith, an annular non-rotatable friction braking element, means carried by said frame adjustably supporting said non-rotatable element for movement with said frame and for permitting movement of said non-rotatable element in a vertical direction relative to said frame and rotatable element into concentric braking relation with said non-rotatable element, torque means for said non-rotatable element secured to said frame at one side of a vertical plane including the axis of said non-rotatable element for holding said non-rotatable element against rotation, and a brake cylinder device carried by said frame and operatively connected to said non-rotatable element for controlling movement thereof into frictional braking engagement with said rotatable element.

4. A brake mechanism for a vehicle truck having wheels and a frame resiliently carried by said wheels, said mechanism comprising an annular, rotatable friction braking element secured to rotate with one of said wheels and having two spaced braking surfaces, a pair of annular, non-rotatable friction braking elements adapted to be moved in opposite directions into frictional braking engagement with said surfaces, a brake cylinder device carried by said frame and comprising a casing, a fluid pressure controlled piston in said casing, a pair of oppositely disposed brake levers one pivotally connecting at one end to said casing and the other pivotally connected at one end to said piston and the opposite ends of said levers being arranged to control movement of said non-rotatable elements into and out of braking engagement with said rotatable element, and means providing a fulcrum for said levers intermediate their ends.

5. A brake mechanism for a vehicle truck having wheels and a frame carried by said wheels, said mechanism comprising an annular rotatable friction braking element carried by one of said wheels and rotatable therewith, an annular non-rotatable friction braking element adapted to be moved into frictional engagement with said rotatable element for braking same, a member carried by said truck frame, means having one end disposed to rock in said member and operatively connected at the opposite end to said non-rotatable element for holding said non-rotatable element against turning, and a brake cylinder piston operatively connected to said means for controlling movement of said non-rotatable element into and out of frictional braking engagement with said rotatable element.

6. A brake mechanism for a vehicle truck having wheels and a frame carried by said wheels, said mechanism comprising an annular, rotatable friction braking element secured to rotate with one of said wheels, an annular non-rotatable friction braking element adapted to be moved into frictional braking engagement with said rotatable braking element for effecting braking thereof, a member associated with said frame, a bifurcated element having its closed end supported to rock in said member and its bifurcated end pivotally connected to said non-rotatable element for holding said non-rotatable element against rotation and adapted to move said non-rotatable element into frictional braking engagement with said rotatable element, and a brake cylinder piston operatively connected to said bifurcated element for controlling the operation thereof.

7. A brake mechanism for a vehicle truck having wheels and a frame carried by said wheels, said mechanism comprising an annular, rotatable friction braking element secured to rotate with one of said wheels, an annular non-rotatable friction braking element adapted to be moved into frictional braking engagement with said rotatable braking element for effecting braking thereof, a brake cylinder device carried by said frame, a bifurcated lever having its closed end supported to rock at said brake cylinder and its bifurcated end pivotally connected to spaced portions of said non-rotatable element for holding same against rotation, and a piston in said brake cylinder device operatively connected to said lever for controlling movement of said non-rotatable element into and out of frictional braking engagement with said rotatable element.

8. A brake mechanism for a vehicle truck having wheels and a frame carried by said wheels, said mechanism comprising an annular, rotatable friction braking element secured to rotate with one of said wheels, an annular non-rotatable friction braking element adapted to be moved into frictional braking engagement with said rotatable braking element for effecting braking thereof, a brake cylinder device carried by said frame and comprising a casing having a channel, a lever having one end extending into said channel and movable therein and having the opposite end secured to said non-rotatable element for holding same against rotation, and a piston in said brake cylinder operatively connected to said lever for controlling operation thereof to move said non-rotatable element into and out of frictional braking engagement with said rotatable elements.

9. A brake mechanism for a vehicle truck having wheels and a frame carried by said wheels, said mechanism comprising an annular, rotatable friction braking element secured to rotate with one of said wheels, an annular non-rotatable friction braking element adapted to be moved into frictional braking engagement with said rotatable braking element for effecting braking thereof, a brake cylinder device carried by said frame and comprising a casing having a channel, a lever having one end extending into said channel and movable therein and having the opposite end secured to said non-rotatable element for holding same against rotation, said lever being operative by said brake cylinder device to effect movement of said non-rotatable element into frictional braking engagement with said rotatable element, and a roller on the end of said lever which extends into said channel for supporting said end of said lever in said channel.

10. A brake mechanism for a vehicle truck having wheels and a frame carried by said wheels, said mechanism comprising an annular, rotatable friction braking element secured to rotate with one of said wheels, a pair of annular, non-rotatable friction braking elements adapted to be moved into frictional engagement with said rotatable element for effecting braking thereof, a pair of levers one connected to each of said non-rotatable elements for controlling movement of said non-rotatable elements into frictional braking engagement with said rotatable element and for holding said non-rotatable elements against rotation, a brake cylinder device secured to said frame and operatively connected to said levers for controlling the operation thereof, and means associated with said brake cylinder device to which the adjacent ends of said levers are anchored to hold said non-rotatable elements against rotation.

11. A brake mechanism for a vehicle truck having wheels and a frame carried by said wheels, said mechanism comprising an annular, rotatable friction braking element secured to rotate with one of said wheels, a pair of annular, non-rotatable friction braking elements adapted to be moved into frictional engagement with said rotatable element for effecting braking thereof, a pair of levers one connected to each of said non-rotatable elements for controlling movement of said non-rotatable elements into frictional braking engagement with said rotatable element and for holding said non-rotatable elements against rotation, a brake cylinder device secured to said frame and operatively connected to said levers for controlling the operation thereof, said brake cylinder device comprising a casing having at one end a channel like extension, means connecting one of said levers to said extension, and a piston in said cylinder operatively connected to the other of said levers for controlling said levers to effect movement of said non-rotatable elements into frictional engagement with said rotatable element, the ends of both of said levers adjacent said brake cylinder device being disposed in the channel like extension for holding said levers and thereby said non-rotatable elements against rotation.

12. A brake mechanism for a vehicle truck having wheels and a frame resiliently supported on said wheels and capable of movement in a vertical direction relative to said wheels, said mechanism comprising an annular rotatable friction braking element secured to rotate with one of said wheels, an annular non-rotatable friction braking element adjustably carried by said frame, means operative to move said non-rotatable element in a substantially vertical direction relative to said frame and rotatable element into concentric relation with said rotatable element regardless of the elevated position of said frame with respect to said wheels, and means for moving said elements into frictional braking engagement.

13. A brake mechanism for a vehicle truck having wheels and a frame resiliently supported on said wheels and capable of movement in a vertical direction relative to said wheels, said mechanism comprising an annular rotatable friction braking element secured to rotate with one of said wheels, an annular non-rotatable friction braking element adjustably carried by said frame, means associated with said non-rotatable element cooperative with said rotatable element upon engagement between said elements to effect movement of said non-rotatable element relative to said frame and rotatable element into concentric braking relation with said rotatable element, and means operative to effect movement of said non-rotatable element into engagement with said rotatable element for effecting centralization thereof with respect to said rotatable element and for braking said rotatable element.

14. A brake mechanism for a vehicle truck having wheels and a truck frame resiliently supported on said wheels and capable of movement in a vertical direction relative to said wheels said mechanism comprising an annular rotatable friction braking element secured to rotate with one of said wheels, an annular non-rotatable friction braking element adapted to be moved into frictional braking engagement with said rotatable element for braking said wheels, spring means carried by said frame for normally supporting said non-rotatable element for movement with said frame and for permitting movement of said non-rotatable element relative to said frame, said elements being so constructed that engagement of said non-rotatable element with said rotatable element is adapted to effect movement of said non-rotatable element relative to said rotatable element into concentric relation therewith, and a brake cylinder device operatively connected to said non-rotatable element for effecting movement thereof into engagement with said rotatable element.

15. A brake mechanism for a vehicle truck having wheels and a truck frame resiliently supported on said wheels and capable of movement in a vertical direction relative to said wheels, said mechanism comprising an annular rotatable friction braking element secured to rotate with one of said wheels, an annular non-rotatable friction braking element, spring means carried by said frame for normally supporting said non-rotatable element for movement with said frame and for permitting movement of said non-rotatable element relative to said frame, and means operatively connected to said non-rotatable element for moving same into frictional braking engagement with said rotatable element, said elements being so constructed and arranged that upon frictional engagement, said non-rotatable element is moved relative to said frame into concentric relation with said rotatable element.

16. A brake mechanism for a vehicle truck having wheels and a truck frame resiliently supported on said wheels and capable of movement in a vertical direction relative to said wheels, said mechanism comprising an annular rotatable friction braking element secured to rotate with one of said wheels, an annular non-rotatable friction braking element, spring means carried by said frame for normally supporting said non-rotatable element for movement with said frame and for permitting movement of said non-rotatable element relative to said frame, a lever having one end secured to said non-rotatable element and the opposite end anchored for holding said non-rotatable element against rotation, a brake cylinder device operatively connected to said lever for effecting movement of said non-rotatable element into coaxial frictional braking relation with said rotatable element.

17. A brake mechanism for a vehicle truck having wheels and a frame resiliently supported on said wheels and capable of movement in a vertical direction relative to said wheels, said mechanism comprising an annular rotatable friction braking element secured to one of said wheels for rotation therewith, an annular non-rotatable friction braking element adapted to frictionally engage said rotatable element for effecting braking of said wheel, means adjustably securing said non-rotatable element to said frame for normally moving said non-rotatable element with said frame and for permitting movement of said non-rotatable element relative to said frame into coaxial relation with said rotatable element, and means for effecting movement of said non-rotatable element into coaxial frictional braking relation with said rotatable element, and for supporting said non-rotatable element against rotation.

18. A brake mechanism for a vehicle truck having wheels and a frame resiliently supported on said wheels and capable of movement in a vertical direction relative to said wheels, said mechanism comprising an annular rotatable friction braking element secured to one of said wheels for rotation therewith, and having a frustro-conical shaped braking surface, an annular non-rotatable friction braking element having a frustro-conical shaped braking surface adapted to co-operate with that on said rotatable element for braking said wheel, means carried by said frame and connected to said non-rotatable element for normally supporting said non-rotatable element for movement with said frame and for permitting movement of said non-rotatable element relative to said frame into concentric relation with said rotatable element, and means for moving said non-rotatable element into frictional braking engagement with said rotatable element, said non-rotatable element upon engagement with said rotatable element being movable relative thereto into concentric relation with said rotatable element.

19. A brake mechanism for a vehicle truck having wheels and a frame resiliently supported on said wheels and capable of movement in a vertical direction relative to said wheels, said mechanism comprising an annular rotatable friction braking element secured to one of said wheels for rotation therewith, and having a frustro-conical shaped braking surface, an annular non-rotatable friction braking element having a frustro-conical shaped braking surface adapted to cooperate with that on said rotatable element for braking said wheel, means carried by said frame and connected to said non-rotatable element for normally supporting said non-rotatable element for movement with said frame and for permitting movement of said non-rotatable element relative to said frame into concentric relation with said rotatable element, and means for moving said non-rotatable element into frictional braking engagement with said rotatable element, said rotatable element being operative upon movement of said non-rotatable element into engagement therewith to shift said non-rotatable element relative to said frame into concentric braking relation with said rotatable element.

20. A brake mechanism for a vehicle truck having wheels and a frame resiliently supported on said wheels and capable of movement in a vertical direction relative to said wheels, said mechanism comprising an annular rotatable friction braking element secured to one of said wheels for rotation therewith, and having a frustro-conical shaped braking surface, an annular non-rotatable friction braking element having a frustro-conical shaped braking surface adapted to cooperate with that on said rotatable element for braking said wheel, means carried by said frame and connected to said non-rotatable element for normally supporting said non-rotatable element for movement with said frame and for permitting movement of said non-rotatable element relative to said frame into concentric relation with said rotatable element, a brake cylinder device carried by said frame, and a lever connecting said brake cylinder device to said non-rotatable element for holding said non-rotatable element against rotation and operative by said brake cylinder device to move said non-rotatable element into frictional braking engagement with said rotatable element, said rotatable element being operative upon engagement of said non-rotatable element to effect movement thereof relative to said frame into concentric relation with said rotatable element.

21. A brake mechanism for a wheel of a vehicle truck having a frame supported by said wheel, said mechanism comprising a sleeve having frustro-conical shaped end portions oppositely arranged with the smaller ends adjacent each other and having a cylindrical portion rigidly joining said smaller ends, the larger end of one end portion being rigidly secured to said wheel, the outer annular face of both of said end portions constituting friction braking surfaces, a pair of oppositely disposed annular frustro-conical shaped friction braking elements encircling the cylindrical portion of said sleeve and movable in opposite directions into frictional engagement with said surfaces, means carried by said frame for supporting said non-rotatable elements, and means for actuating said non-rotatable elements.

22. A brake mechanism for a wheel of a vehicle truck having a truck frame resiliently supported by said wheel, said mechanism comprising a sleeve rigidly secured at one end to said wheel and having at each of its opposite ends an outwardly extending annular portion constituting two oppositely disposed annular rotatable friction braking elements, a pair of annular, non-rotatable friction braking elements disposed between said rotatable elements and movable in opposite directions into frictional braking engagement with said rotatable elements, means supporting said non-rotatable elements from said frame, and means interposed between and operable on spaced portions of said non-rotatable elements for actuating same.

23. A brake mechanism for a wheel of a vehicle truck having a truck frame resiliently supported by said wheel, said mechanism comprising a sleeve rigidly secured at one end to said wheel and having at both of its opposite ends an outwardly extending annular portion constituting two oppositely disposed annular rotatable friction braking elements, said end annular portions being rigidly connected together by a central cylindrical portion, a pair of annular non-rotatable friction braking elements encircling said central portion and having a central aperture of greater diameter than that of said central portion whereby said non-rotatable elements are capable of movement relative to said rotatable elements in a vertical direction, means for moving said non-rotatable elements in opposite directions into frictional engagement with said rotatable elements, and means carried by said frame for supporting said non-rotatable elements.

24. A brake mechanism for a wheel of a vehicle truck having a truck frame resiliently supported by said wheel, said mechanism comprising a sleeve rigidly secured at one end to said wheel and having at both ends a frustro-conical shaped portion, said frustro-conical shaped end portions being oppositely disposed with their smaller ends adjacent each other and rigidly connected together by a central tubular portion, the outer annular faces of said end portions constituting a pair of oppositely disposed friction faces, a pair of oppositely disposed, frustro-conical shaped non-rotatable friction braking elements disposed between the end portions and encircling the tubular portion of the sleeve and movable in opposite directions into frictional braking engagement with said friction faces, means for actuating said non-rotatable elements, said non-rotatable elements having a central aperture of greater diameter than that of the tubular portion of said sleeve whereby said non-rotatable elements are capable of movement in a vertical direction relative to said sleeve, and means secured to said frame for resiliently supporting said non-rotatable elements.

25. A brake mechanism for a vehicle wheel comprising a sleeve rigidly secured at one end to said wheel and having an annular friction braking surface, an annular non-rotatable friction braking element for frictionally engaging said surface, means for actuating said non-rotatable element, there being a plurality of spaced openings connecting the interior of said sleeve around the end secured to said wheel and open at one face of said wheel to the atmosphere whereby upon rotation of said wheel, a flow of air is created through said sleeve and out of said openings over the surface of said sleeve opposite said braking surface for dissipating heat therefrom incident to braking.

26. A brake mechanism for a vehicle wheel comprising a sleeve having an outwardly flaring end portion rigidly secured to spaced portions of said wheels between which portions communication is established between the interior of said sleeve and the atmosphere for effecting the flow of a stream of air through said sleeve upon rotation of said wheel, an annular non-rotatable friction braking element movable into frictional engagement with the exterior surface of said sleeve for effecting braking of said wheel, and means for actuating said non-rotatable element, the flow of air through said sleeve being adapted to effect cooling of said sleeve incident to braking.

27. A brake mechanism for a vehicle truck having wheels and a frame carried by said wheels, said mechanism comprising rotatable and non-rotatable annular friction braking elements adapted to be moved into frictional braking engagement for braking one of said wheels, the rotatable element being carried by the wheel, and resilient means carried by said truck frame for supporting the non-rotatable element and to permit the non-rotatable element to move in a vertical direction relative to said frame into concentric relation with said rotatable element.

28. A brake mechanism for a vehicle truck having wheels and a frame carried by said wheels, said mechanism comprising rotatable and non-rotatable annular friction braking elements adapted to be moved into frictional braking engagement for braking one of said wheels, the rotatable element being carried by the wheel, a spring carried by said frame for supporting said non-rotatable element in a predetermined position with respect to said frame and operative to permit movement of said non-rotatable element in a vertical direction relative to said frame into concentric relation with said rotatable element, and resilient means for opposing movement of said non-rotatable element either up or down from said position.

29. A brake mechanism for a vehicle truck having wheels and a frame carried by said wheels, said mechanism comprising rotatable and non-rotatable annular friction braking elements adapted to be moved into frictional braking engagement for braking one of said wheels, the rotatable element being carried by the wheel, a spring carried by said frame for supporting said non-rotatable element in a predetermined position with respect to said frame and operative to permit movement of said non-rotatable element in a vertical direction relative to said frame into concentric relation with said rotatable element, and resilient means for opposing movement of said non-rotatable element either up or down from said position, said resilient means being inactive on said non-rotatable element in said position.

30. A brake mechanism for a vehicle truck having wheels and a frame carried by said wheels, said mechanism comprising rotatable and non-rotatable annular friction braking elements adapted to be moved into frictional braking engagement for braking one of said wheels, the rotatable element being carried by the wheel, a spring carried by said frame for supporting said non-rotatable element in a predetermined position with respect to said frame and operative to permit movement of said non-rotatable element in a vertical direction relative to said frame into concentric relation with said rotatable element, another spring for opposing movement of said non-rotatable element either up or down from said position, and means for holding said other spring under predetermined tension and inactive on said rotatable element in said position.

31. In a vehicle brake, in combination, a wheel and axle assembly, a truck frame supported by said assembly and movable vertically relative thereto, a non-rotatable brake element carried by the truck frame movable vertically therewith and also relative thereto, said brake element encircling the axle of said assembly and being arranged eccentrically of the axle, a rotatable brake element arranged concentrically of the axle and secured to rotate therewith, means carried by the truck frame operative to move the non-rotatable brake element into frictional braking engagement with said rotatable element, and for effecting movement of said non-rotatable element relative to the truck frame into concentric relationship with said axle and thereby with said rotatable element, the movement into concentric relationship with the axle occurring when the non-rotatable element is being moved toward its frictional braking position.

32. In a vehicle brake, in combination, a wheel and axle assembly, a truck frame supported by said assembly and movable vertically relative thereto a limited distance, a brake element encircling the axle of said assembly and secured to rotate therewith, a non-rotatable brake element carried by said truck frame movable into frictional braking engagement with the rotatable brake element, said non-rotatable brake element with the vehicle either empty or under load being out of axial relationship with the rotatable element, and means for effecting movement of said non-rotatable element relative to said frame into coaxial relationship with said rotatable braking element and into frictional braking engagement with said rotatable braking element.

33. A brake mechanism for a vehicle truck having a wheel and a frame supported on and capable of vertical movement relative to said wheel, annular rotatable and non-rotatable friction braking elements adapted to frictionally engage for braking said wheel, said rotatable braking element being secured to rotate with said wheel in concentric relation therewith at all times, means for supporting said non-rotatable element in concentric braking relation with said rotatable element, and a brake cylinder device for actuating said elements secured to said frame for vertical movement therewith and operatively connected to said elements.

34. In a vehicle brake, in combination, a wheel and axle assembly, a truck frame supported from said assembly and being movable vertically relative to the assembly, rotatable and non-rotatable circular brake elements adapted to frictionally interengage when in axial alignment with each other for retarding the rotary motion of the assembly, the rotatable element being carried by the assembly for rotation therewith, and the non-rotatable brake element being adjustably carried by the truck frame for movement relative to the truck frame into axial alignment with the rotatable brake element, and means for effecting the frictional braking engagement of the braking elements and for insuring the axial alignment of the braking elements at the time they frictionally interengage.

35. In a vehicle brake, in combination, a wheel and axle assembly, a truck frame supported from said assembly and being movable vertically relative to the assembly, rotatable and non-rotatable circular brake elements adapted to frictionally interengage when in axial alignment with each other for retarding the rotary motion of the assembly, the rotatable element being carried by the assembly for rotation therewith, and the non-rotatable brake element being adjustably carried by the truck frame for movement relative to the truck frame into axial alignment with the rotatable brake element, and means for first effecting movement of the non-rotatable element into axial alignment with said rotatable element and for then effecting the frictional braking engagement of the braking elements.

36. In a vehicle brake, in combination, a wheel and axle assembly, a truck frame supported from said assembly and being movable vertically relative to the assembly, rotatable and non-rotatable circular brake elements adapted to frictionally interengage when in axial alignment with each other for retarding the rotary motion of the assembly, the rotatable element being carried by the assembly for rotation therewith, and the non-rotatable brake element being adjustably carried by the truck frame for movement relative to the truck frame into axial alignment with the rotatable brake element, and means for effecting the frictional braking engagement of the braking elements, said means comprising wedge means operative prior to the frictional braking interengagement of said elements for effecting the movement of the non-rotatable element into axial alignment with said rotatable element.

37. In a vehicle brake, in combination, a wheel and axle assembly, a truck frame supported from said assembly and being movable vertically relative to the assembly, rotatable and non-rotatable circular brake elements adapted to frictionally interengage when in axial alignment with each other for retarding the rotary motion of the assembly, the rotatable element being carried by the assembly for rotation therewith, and the non-rotatable brake element being adjustably carried by the truck frame for movement relative to the truck frame into axial alignment with the rotatable brake element, and means for effecting the frictional braking engagement of the braking elements, said means comprising wedge means associated with said brake elements adapted to cooperate for insuring the axial alignment of said elements at the time said surfaces move into braking engagement.

38. A brake mechanism for a vehicle truck having wheels and a truck frame resiliently supported on said wheels and capable of movement in a vertical direction relative to said wheels, said mechanism comprising an annular, rotatable friction braking element secured to rotate with one of said wheels, an annular non-rotatable friction braking element for frictional braking engagement with said rotatable element and adjustably carried by said frame for vertical movement relative thereto, and means for effecting movement of said non-rotatable element relative to said frame into axial relation with said rotatable braking element and into frictional braking engagement with the rotatable braking element.

39. A brake mechanism for a vehicle truck having wheels and a truck frame resiliently supported on said wheels and capable of movement in a vertical direction relative to said wheels, said mechanism comprising an annular, rotatable friction braking element secured to rotate with one of said wheels, an annular non-rotatable friction braking element, adjustable means for normally supporting said non-rotatable element from said frame for movement therewith and for permitting movement thereof relative to said frame and to said rotatable element in a vertical direction, and means for effecting movement of said non-rotatable element relative to said frame and to said rotatable element into axial relation with said rotatable element and into frictional braking engagement with said rotatable braking element.

40. A brake mechanism for a vehicle truck having wheels and a truck frame resiliently supported on said wheels and capable of movement in a vertical direction relative to said wheels, said mechanism comprising an annular, rotatable friction braking element secured to rotate with one of said wheels, an annular non-rotatable friction braking element, resilient means for normally supporting said non-rotatable element from said frame for movement therewith and for permitting movement thereof relative to said frame and rotatable element in a vertical direction, and means for effecting movement of said non-rotatable element relative to said frame and rotatable element into axial relation with said rotatable element and into frictional braking engagement with said rotatable braking element.

41. A brake mechanism for a vehicle truck having wheels and a truck frame resiliently supported on said wheels and capable of movement in a vertical direction relative to said wheels, said mechanism comprising an annular, rotatable friction braking element secured to rotate with one of said wheels, an annular non-rotatable friction braking element for frictional braking engagement with said rotatable element and adjustably carried by said frame for vertical movement relative thereto, and means for effecting movement of said non-rotatable element relative to said frame into axial relation with said rotatable braking element and into frictional braking engagement with the rotatable braking element, said means comprising a fluid pressure actuating motor carried by said truck frame.

42. A brake mechanism for a vehicle truck having wheels and a truck frame resiliently supported on said wheels and capable of movement in a vertical direction relative to said wheels, said mechanism comprising an annular, rotatable friction braking element secured to rotate with one of said wheels, an annular non-rotatable friction braking element, adjustable means for normally supporting said non-rotatable element from said frame for movement therewith and for permitting movement thereof relative to said frame and to said rotatable element in a vertical direction, and means carried by said truck frame for actuating said non-rotatable element for effecting movement of said non-rotatable element into coaxial, frictional braking relation with said rotatable element.

43. A brake mechanism for a vehicle truck having wheels and a truck frame resiliently supported on said wheels and capable of movement in a vertical direction relative to said wheels, said mechanism comprising an annular, rotatable friction braking element secured to rotate with one of said wheels, an annular non-rotatable friction braking element for frictional braking engagement with said rotatable element and adjustably carried by said frame for vertical movement relative thereto, and means for effecting movement of said non-rotatable element relative to said frame into axial relation with said rotatable braking element and into frictional braking engagement with the rotatable braking element, said means comprising lever means operative to effect the operation of said non-rotatable element, and a brake cylinder device carried by said tuck frame operative to actuate said lever means.

44. A brake mechanism for a wheel of a vehicle comprising an annular rotatable friction braking element secured to rotate with said wheel and having a plurality of friction faces, an annular non-rotatable braking element disposed adjacent each of the friction faces of said rotatable element, a brake cylinder, a pair of spaced levers having one end connected to said brake cylinder for operation thereby, the opposite end of one of said levers being operatively connected to one of said non-rotatable elements and the opposite end of the other lever being operatively connected to the other non-rotatable element, and a link pivotally connected at one end to one of said levers intermediate its ends and pivotally connected at its opposite end to the other of said levers intermediate its ends whereby said brake cylinder device is operative to control movement of said non-rotatable elements into and out of frictional engagement with said rotatable element.

45. A brake mechanism for a vehicle having wheels and a truck frame carried by said wheels, said mechanism comprising an annular rotatable friction braking element secured to one of said wheels for rotation therewith and having a plurality of friction faces, an annular, non-rotatable friction braking element disposed adjacent each of the friction faces of said rotatable element, a brake cylinder device secured to said frame, a pair of levers connected at one end to said brake cylinder device, the opposite end of each of said levers being operatively connected to spaced portions of one of said non-rotatable elements, a link pivotally connecting said levers together intermediate their ends whereby operation of said brake cylinder device is adapted to control movement of said non-rotatable elements into and out of frictional engagement with said rotatable element, and means associated with said brake cylinder device securing the adjacent ends of said levers against movement in a direction radially of said cylinder whereby said levers are operative to hold said non-rotatable elements against turning with said rotatable element.

46. A brake mechanism for a vehicle having wheels and a truck frame carried by said wheels, said mechanism comprising an annular rotatable friction braking element secured to one of said wheels for rotation therewith, and having a plurality of friction faces, an annular, non-rotatable friction braking element disposed adjacent each of the friction faces of said rotatable element, a brake cylinder device secured to said frame, a pair of levers connected at one end to said brake cylinder device, the opposite end of each of said levers being operatively connected to spaced portions of one of said non-rotatable elements, a link pivotally connecting said levers together intermediate their ends whereby operation of said brake cylinder device is adapted to control movement of said non-rotatable elements into and out of frictional engagement with said rotatable element, said brake cylinder device having at each end a channel shaped portion in which the adjacent ends of said levers are disposed for holding said levers and thereby said non-rotatable elements against turning with said rotatable element.

47. A brake mechanism for a wheel of a vehicle comprising an annular rotatable friction braking element secured to rotate with said wheel and having a plurality of friction faces, an annular non-rotatable braking element disposed adjacent each of the friction faces of said rotatable element, a brake cylinder, a pair of spaced levers, one end of one of said levers having a fixed fulcrum and the adjacent end of the other lever being connected to said brake cylinder for operation thereby, the opposite end of one of said levers being operatively connected to one of said non-rotatable elements and the opposite end of the other lever being operatively connected to the other non-rotatable element, and a link pivotally connected at one end to one of said levers intermediate its ends and pivotally connected at its opposite end to the other of said levers intermediate its ends whereby said brake cylinder device is operative to control movement of said non-rotatable elements into and out of frictional engagement with said rotatable element.

CLYDE C. FARMER.